Figure 1:
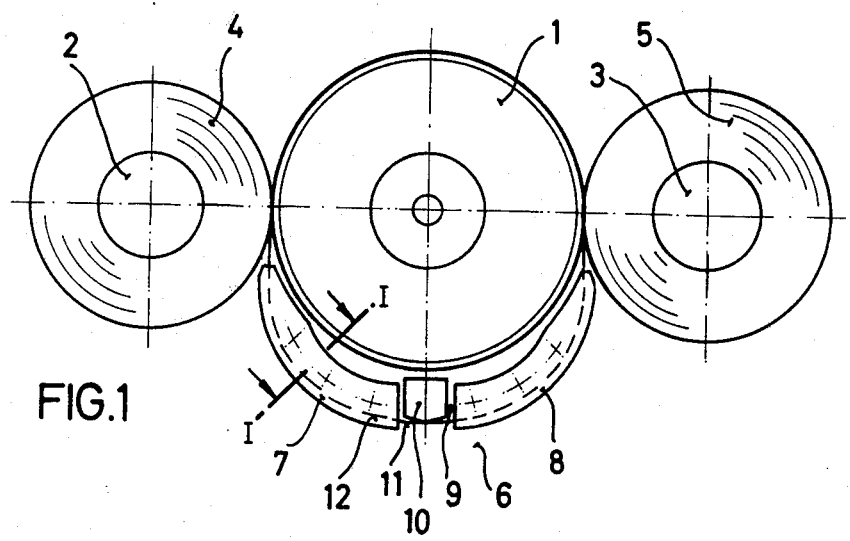

United States Patent [19]

Schoettle et al.

[11] 4,276,575
[45] Jun. 30, 1981

[54] TAPE GUIDE FOR HIGH-SPEED TAPE TRANSPORT APPARATUS

[75] Inventors: Klaus Schoettle, Heidelberg; Werner Hoffmann, Ludwigshafen; Eduard Kaemmer, Mutterstadt; Klaus Boehlke, Hessheim; Helmut Lewin, Bobenheim-Roxheim, all of Fed. Rep. of Germany

[73] Assignee: BASF Aktiengesellschaft, Ludwigshafen, Fed. Rep. of Germany

[21] Appl. No.: 86,136

[22] Filed: Oct. 18, 1979

Related U.S. Application Data

[63] Continuation of Ser. No. 906,443, May 17, 1978.

[30] Foreign Application Priority Data

May 18, 1977 [DE] Fed. Rep. of Germany ....... 2722509

[51] Int. Cl.$^3$ .............................................. G11B 15/60
[52] U.S. Cl. ............................... 360/130.21; 226/196; 226/198; 308/DIG. 8
[58] Field of Search ........... 360/130.2, 130.21, 130.31, 360/130.32, 84, 128; 242/157 R, DIG. 8, DIG. 9; 74/231 S; 226/196, 198

[56] References Cited

U.S. PATENT DOCUMENTS

| 3,888,429 | 6/1975 | Mac ..................................... 226/196 |
| 3,950,599 | 4/1976 | Board, Jr. ....................... 308/DIG. 8 |
| 3,980,253 | 9/1976 | Burdorf et al. ........................ 360/95 |
| 4,098,446 | 7/1978 | Schoettle et al. ..................... 226/196 |
| 4,153,920 | 5/1979 | Shirahata et al. ..................... 360/131 |

Primary Examiner—Alfred H. Eddleman
Attorney, Agent, or Firm—Keil & Witherspoon

[57] ABSTRACT

A tape guide, especially a tape guide of large surface area for high-speed tape transport apparatus, having at least on the tape guide surface a mixture of plastics material and lubricant exhibiting a specific surface roughness and a specific coefficient of friction, the said mixture consisting of 10 to 70 percent by weight of lubricant, e.g. natural graphite, molybdenum disulfide and/or tungsten disulfide, and 90 to 30 percent by weight of plastics material, e.g. polyoxymethylene, polyethylene and polypropylene. The plastic/lubricant mixture may also be in the form of a strip-like element fastened to a backing member. The tape guide can be used for any type of tape transport apparatus, especially in video recording equipment employing magnetic tape on which the signals are recorded in longitudinal tracks.

16 Claims, 4 Drawing Figures

U.S. Patent  Jun. 30, 1981  4,276,575

TAPE GUIDE FOR HIGH-SPEED TAPE TRANSPORT APPARATUS

This is a continuation of application Ser. No. 906,443 filed May 17, 1978.

This invention concerns a tape guide, especially a tape of guide of large surface area for high-speed tape transport apparatus, which tape guide can operate without the introduction of extraneous air to form an air film for the fast-moving magnetic tape.

Video tape guides of large surface area for use in conjunction with a film of air are already known which have, for example, a concave guide surface. As has been described, for example, in German Utility Model No. 75 35 256, a tape guide of this kind consists of stainless-steel elements fastened to a backing member. The guide surface is of uniform slight roughness, so that optimum tape flying behavior is achieved when the tape guide is employed in conjunction with an air film. The air film between the guide surface and the tape is produced predominantly by an air pump, by means of which the air is fed at predetermined points in the tape guide through nozzles into the space between the tape and the guide surface.

Notwithstanding the use of extraneous air in the known tape guide, it is not possible to prevent the tape from making contact with the guide surface in certain places, especially in the case of very thin and flexible magnetic tapes. This happens mainly at or near the guide flanges, at the points at which the tape enters and leaves the tape guide and in the region of the air supply nozzles or other depressions in the guide surface. At these places the guide surface is polished, and this usually leads to adhesion of the tape to the guide surface and/or interferes with the formation of a uniform air film of sufficient thickness. The supply of extraneous air necessitates relatively high equipment, operating and manufacturing costs, due to the pump, the air supply pipes, nozzles, power consumption by the pump, and the tedious and time-consuming manufacture of the tape guide, especially of the guide surface, etc.

These disadvantages are particularly serious in the case of portable, battery-operated equipment in whose manufacture and operation a minimum of costs, volume and power consumption is aimed at.

According to German Published Application (DAS) No. 20 44 876, lubricated liners for magnetic tape cassettes for the lateral guidance of the tape edges are known. These liners are coated with a layer of pulverulent graphite, molybdenum disulfide or tungsten disulfide which has a low coefficient of friction.

However, according to the above published application the coating of lubricant can only be used in conjunction with a further, electrically conductive layer provided on the liner to reduce the high electrostatic charges which, on the one hand, lead to extremely strong adhesion of the liner to the magnetic tape and, on the other, produce undesirable noise. However, such a conductive layer is extremely expensive and inaccurate. An accuracy of ±25 $\mu$m between the guide flanges is unattainable in the case of a coating of lubricant applied by spraying. Due to the high type speed and the abrasive action of the tape, the coating is quickly worn away, especially at the flanges.

An object of the present invention is to provide a tape guide of the type referred to in the introduction for magnetic tape transport apparatus, which tape guide does not have the disadvantages of the prior art discussed above.

We have found, surprisingly, that this object is achieved with a tape guide, especially a tape guide of large surface area for high-speed tape transport apparatus, which can operate without the introduction of extraneous air to form an air film for the fast-moving magnetic tape if at least the material forming the guide surface for the tape consists of plastics material and lubricant, the said material having a surface roughness of 0.1 to 1 $\mu$m and a coefficient of friction of between 0.25 and 0.40.

As a result, adhesion is prevented due to the added lubricant and yet the electrostatic charges can be kept sufficiently small. The manufacture of these tape guides in any desired shape can be effected very easily by injection or compression molding.

Another advantage of the invention resides in the fact that it provides a tape guide for a portable, battery-operated high-speed tape transport apparatus, in particular for video recorders.

In a further embodiment of the tape guide of the invention, the material forming the guide surface contains 10 to 70, preferably 20 to 50, percent by weight of lubricant such as graphite and/or molybdenum disulfide and/or tungsten disulfide.

Owing to the electrical conductivity of graphite, the electrostatic charges which may lead to blocking of the tape can be avoided.

In an advantageous embodiment of the invention, the lubricant consists preferably of natural graphite with a carbon content of approximately 95% and a particle size of less than 0.2 mm$^2$.

In tape transport apparatus employing high tape transport speeds, i.e. between 2.5 and 9 m/s, for which the tape guide of the present invention is chiefly intended, a stable air film is produced between the guide surface and the magnetic tape, owing to the air entrained by the tape, when the tape guide surface is of suitable shape and exhibits a uniform roughness of preferably 0.1 to 1.0 $\mu$m, which air film further reduces friction beyond the effect of the graphite and possibly other lubricants. It has also been found in practice that minute graphite particles (<0.05 $\mu$m) are detached from the tape guide surface and transferred to the surface of the magnetic tape, thus reducing friction between the magnetic head and the magnetic tape, whereby the life of a magnetic head consisting of ferrite is increased by approximately 20%.

In a further advantageous embodiment of the invention, the mixture forming the guide surface consists of 50 to 80 percent by weight of polyoxymethylene, polyethylene or polypropylene.

The employment of these materials helps to achieve optimal tape running characteristics and to prolong the life of the tape guide.

In a particularly economical embodiment of the invention, the tape guide comprises a strip-like element which forms the guide surface and which consists of a mixture of plastics material and lubricant, said element being fastened to a backing member.

In a preferred embodiment, the strip-like element is detachably fastened to a backing member, as a result of which a strip, whose guide surface is worn or exhibits other altered characteristics, which causes serious problems, can be readily replaced.

To facilitate replacement, the strip-like element is advantageously fastened in at least one groove in the backing member.

Figure 3:
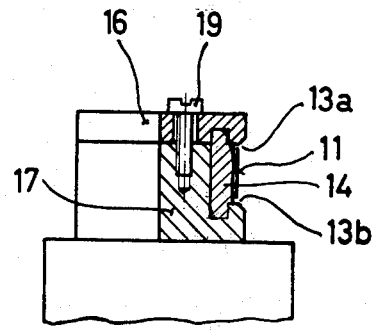
Figure 2:
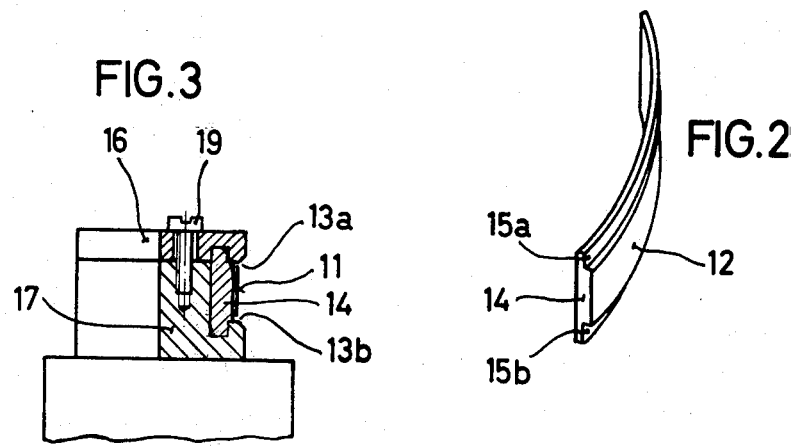
Figure 4:
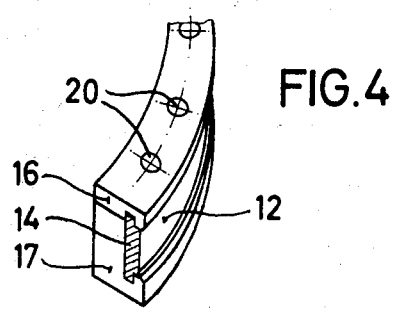

Further details of the tape guide are disclosed in the following description of the embodiments illustrated in the accompanying drawings, in which FIG. 1 is a plan view a tape transport apparatus with a central capstan and a tape guide according to the invention, FIG. 2 shows a strip constituting the guide surface, FIG. 3 is a cross-section through tahe tape guide of FIG. 1, taken along line I—I, showing the strip of FIG. 2, and FIG. 4 shows, in diagrammatic representation, part of the tape guide of the invention comprising a backing member and a strip-like element serving as the guide surface.

FIG. 1 shows a transport apparatus with a central capstan 1, hubs 2 and 3, tape reels 4 and 5, a two-part tape guide 6, of which the lateral part are marked 7 and 8, and a magnetic head 10. The latter is arranged within an intermediate space 9 and bears against the unsupported section of tape between the lateral parts 7 and 8 to effect recording and reproduction. Tape tape 11 is provided with, for example, a large number of parallel magnetic tracks, and the magnetic head 10 can be moved in a direction perpendicular to the plane of the drawing and hence accurately positioned on any of these tracks. The tape 11 is transported over the guide surfaces 12 of the tape guide 6 at high speed. In the vertical plane, the tape is guided by flanges 13a and 13b. Each guide surface 12 may advantageously be formed by a strip 14 of material such as is shown in FIGS. 2 to 4. The material of the guide surface contains 10 to 70 percent, and preferably 20 to 50 percent by weight, of lubricant and 90 to 30 percent, and preferably 80 to 50 percent by weight, of plastics material. Examples of lubricants are graphite, molybdenum disulfide and tungsten disulfide.

In practice, all sorts of graphite can be used, preferably however natural graphite with a carbon content of 95% and of such a size distribution according to DIN 4188 that at least 70% is retained on a screen having an aperture of 0.16 mm. To manufacture the guide surface 12, graphite is preferably employed in flaky or pulverulent form.

Suitable plastics materials are, for example, polymers, polycondensates and polyadducts. Preferred materials are thermoplastic materials which melt at temperatures between 80° and 300° C. without decomposition.

Examples of suitable polymers are homopolymers and copolymers of ethylenically unsaturated organic compounds such as olefin polymers, e.g. polyethylene and polypropylene, styrene polymers such as polystyrene and impact-resistant polystyrene, chlorine- and fluorine-containing polymers such as polyvinyl chloride, polyvinylidene chloride, polytrifluoroethylene chloride and chlorinated polyolefins, and also polymethyl methacrylates and polychlorinated polyolefins as well as polyacrylates. Examples of polycondensates or polyadducts are polyamides, polyesters, polycarbonates, polyacetals and polyurethanes. The tape guides may also contain mixtures of the said plastics materials.

Particularly advantageous results are obtained with guide surfaces 12 which consist of a material containing 20 to 50 percent by weight of graphite and 80 to 50 percent by weight of polyoxymethylene, and in particular a polyoxymethylene having a density of preferably about 1.41 g/cm$^3$ and a melt index of preferably about 9 g/10 min.

Equally advantageous are guide surfaces consisting of a mixture of 20 to 50 percent by weight of graphite and 80 to 50 percent by weight of polyethylene, especially a polyethylene having a density of preferably about 0.96 g/cm$^3$ and a melt index of preferably about 4.5 g/10 minutes, or guide surfaces consisting of 20 to 50 percent by weight of graphite and 80 to 50 percent by weight of polypropylene having a density of preferably about 0.908 g/cm$^3$ and a melt index of preferably about 2.5 g/10 minutes.

The tape guides, whether in one piece or in the form of strips, can be manufactured in a very simple manner. For example, the solid, particulate starting materials are first mixed together, and the resulting mixture is then heated to temperatures of between 100° and 300° C., preferably from 150° to 250° C., advantageously in an extruder, to give a homogeneous mixture. This mixture may then be extruded, cooled and granulated and the granules thus obtained can then be molded in molds of the desired shape at temperatures between 100° and 300° C., pressures between 10 and 400 kg/cm$^2$ and dwell times of between 2 and 40 minutes. It is also possible to mold the well-mixed, still hot mixture of starting materials after extrusion in the desired shape between endless belts.

Generally, the electrical conductivity of the material is between 0.1 and 10 mho; its strength according to DIN 53,455 is preferably 500 and 3000 N/cm$^2$. The material can also be readily machined, for example cut, milled and drilled.

The coefficient of friction of the material is preferably within a range of 0.20 to 0.40, which corresponds to a reduction in friction, as compared with steel, of at least 13% up to a maximum of 45%. For example, when polyoxymethylene is used as the plastics material and the graphite content is 40%, a coefficient of friction of 0.28 is achieved (cf. the Table below).

The strip 14 illustrated in FIG. 2 which forms the guide surface 12 is preferably of rectangular cross-section and arc-shaped in the longitudinal direction.

The guide strip 14 has stepped edge portions 15a and 15b. After the guide strips 14 have been inserted in the backing members 7 and 8 whose upper parts 16 and lower parts 17 contain grooves 18, they are preferably held in position by means of screws 19 which cooperate with threaded bores 20. Obviously, it is also possible to fasten thin strips 14 to the backing members by other suitable means, e.g. with the aid of integral hooks provided at the ends of the strip or by means of adhesive.

FIG. 3 is a cross-sectional view of the tape guide, taken along line I—I of FIG. 1, which shows the backing member and guide strip in the assembled state.

As can be seen from FIG. 3, the edges 13a and 13b for vertical guidance of the tape 11 project beyond the guide surface 12. It is of course also possible to arrange guide surfaces consisting of the plastics material/lubricant mixture only at those points where the tape makes contact with the tape guide, for example at the points at which the tape enters and leaves the tape guide.

To compare two types of tape guide, one consisting of tungsten carbide (center line average value ~0.1 μm) and the other consisting of a mixture of plastics material and lubricant according to the present invention, the coefficients of friction of a video tape hanging over rotating cylindrical member and subjected to a specific load were determined under the following experimental conditions. This test therefore constitutes a combined static friction/sliding friction measurement.

Type of tape: Chromium dioxide (CrO$_2$) (center line average value ~0.08 μm)
Width of tape: 6.35 mm (¼ inch)
Relative velocity between tape and rotating member: 1 mm/sec
Load: 0.5 N (Newton)
Temperature: 23° C.
Humidity: 50% relative
Results:

| Results: Experiment No. | Basic material of tape guide | Lubricant | | Coefficient of friction |
|---|---|---|---|---|
| 1 | Tungsten carbide | — | | 0.46 |
| 2 | Polyethylene | 80% Graphite | 20% | 0.33 |
| 3 | Polyethylene | 70% Graphite | 30% | 0.33 |
| 4 | Polyoxymethylene | 60% Graphite | 40% | 0.28 |
| 5 | Polyoxymethylene | 60% Graphite MoS$_2$ | 35% 5% | 0.34 |
| 6 | Polyoxymethylene | 70% Graphite MoS$_2$ | 25% 5% | 0.37 |

The polyethylene employed was ®Lupolen 6011 L (product and registered trademark of BASF Aktiengesellschaft, 6700 Ludwigshafen, Germany) and the polyoxymethylene used was POM N 2200 (also a product of BASF Aktiengesellschaft, Ludwigshafen, Germany). Both these plastics materials are suitable for injection molding, and injection-molded articles can be manufactured economically therefrom in large numbers.

The Table shows that the use of the plastics materials polyethylene and polyoxymethylene in conjunction with lubricants brings about a reduction in friction, as compared with tungsten carbide, of (0.46−0.28)/0.46% =39% and, on average, of (0.46−0.33)/0.46% =28%. In this respect, polypropylene is roughly equivalent to polyethylene.

Tungsten disulfide for instance may be used instead of molybdenum disulfide as lubricant or lubricant additive.

We claim:

1. A tape guide for tape transport apparatus, wherein at least the material forming the guide surface for the tape consists of plastics material and lubricant, the said material having a surface roughness of 0.1 to 1 μm and a coefficient of friction of between 0.20 and 0.40.

2. A tape guide according to claim 1, wherein the material contains 10 to 70 percent by weight of lubricant.

3. A tape guide according to claim 1, wherein the lubricant used is natural graphite.

4. A tape guide according to claim 1, wherein the material contains 80 to 50 percent by weight of polyethylene.

5. A tape guide according to claim 1, wherein a strip-like element consisting of plastics materials and lubricant and fastened to a backing member forms the guide surface.

6. A tape guide according to claim 1, wherein the material contains 80 to 50 percent by weight of polypropylene.

7. A tape guide according to claim 1, wherein the material contains 80 to 50 percent by weight of polyoxymethylene.

8. A tape guide of large surface area for high-speed tape transport apparatus, wherein a strip-like element which consists of plastics material and lubricant and has a surface roughness of 0.1 to 1 μm and a coefficient of friction of between 0.20 and 0.40 forms the guide surface for the tape.

9. A tape guide according to claim 8, wherein the strip-like element is fastened to a backing member.

10. A tape guide according to claim 9, wherein the strip-like element is fastened in at least one groove in the backing member.

11. A tape guide according to claim 8, wherein the material contains 10 to 70 percent by weight of lubricant.

12. A tape guide according to claim 11, wherein the material contains 20 to 50 percent by weight of lubricant.

13. A tape guide according to claim 12, wherein the lubricant used is natural graphite.

14. A tape guide according to claim 8, wherein the material contains 80 to 50 percent by weight of polyoxymethylene.

15. A tape guide for high-speed tape transport apparatus, wherein a strip-like element which consists of 20 to 50 percent by weight of lubricant and 80 to 50 percent by weight of polyoxymethylene and has a surface roughness of 0.1 to 1 μm and a coefficient of friction of between 0.20 and 0.40 forms the guide surface for the tape.

16. A tape guide according to claim 15, wherein the lubricant used is natural graphite.

* * * * *